United States Patent [19]
Isobe

[11] Patent Number: 5,632,144
[45] Date of Patent: May 27, 1997

[54] EXHAUST GAS RE-CIRCULATION CONTROL DEVICE FOR INTERNAL COMBUSTION ENGINES

[75] Inventor: Daiji Isobe, Toyohashi, Japan

[73] Assignee: Nippondenso Co., Ltd., Kariya, Japan

[21] Appl. No.: 535,937

[22] Filed: Sep. 28, 1995

[30] Foreign Application Priority Data

Oct. 31, 1994 [JP] Japan .................. 6-267808

[51] Int. Cl.$^6$ .................. F01N 3/28; F02M 25/06
[52] U.S. Cl. .................. 60/277; 60/278
[58] Field of Search .................. 60/277, 278

[56] References Cited

U.S. PATENT DOCUMENTS

| | | | |
|---|---|---|---|
| 4,007,589 | 2/1977 | Neidhard | 60/278 |
| 4,393,840 | 7/1983 | Tanaka et al. | |
| 5,201,303 | 4/1993 | Kojima | |
| 5,331,560 | 7/1994 | Tamura | |
| 5,426,934 | 6/1995 | Hunt | 60/278 |

FOREIGN PATENT DOCUMENTS

| | | |
|---|---|---|
| 57-146041 | 9/1982 | Japan. |
| 60-150469 | 8/1985 | Japan. |
| 63-097862 | 4/1988 | Japan. |
| 2-169853 | 6/1990 | Japan. |

*Primary Examiner*—Douglas Hart
*Attorney, Agent, or Firm*—Cushman, Darby & Cushman IP Group of Pillsbury Madison & Sutro LLP

[57] ABSTRACT

An exhaust re-circulation control device for gasoline engines is provided, which realizes efficient reduction of NOx in the low-temperature idling ranges before the catalytic converter is activated while preventing deterioration of driveability and engine stalling. Normally, an exhaust re-circulation control device comprises a re-circulation passage which re-circulates a portion of exhaust gas from an engine to an intake system and an exhaust re-circulation valve which opens and closes the re-circulation passage. Also, the engine has a bypass passage which controls idling rpm and an idling rpm control valve. In the engine, the low-temperature idling range before the catalytic converter is activated is detected exhaust re-circulation ratio is obtained and based on a target idling speed during that time to prevent deterioration of driveability and engine stalling and to efficiently reduce NOx emissions, even when the catalytic converter is not active.

7 Claims, 13 Drawing Sheets

EXHAUST GAS RE-CIRCULATION CONTROL DEVICE FOR INTERNAL COMBUSTION ENGINES

CROSS REFERENCE TO RELATED APPLICATION

This application is based on and claims priority of Japanese Patent Application No. 6-267808 filed on Oct. 31, 1994, the content of which is incorporated herein by reference.

BACKGROUND OF THE INVENTION

1. Field of the Invention

The present invention relates to an exhaust re-circulation control device for internal combustion engines which re-circulates exhaust gas to an air intake of an engine in order to reduce NOx emissions and, particularly to an exhaust re-circulation control device which contributes to efficient reduction of NOx in low-temperature idling range of a gasoline.

2. Description of Related Art

As is well known, exhaust re-circulation control devices are devices which extract a portion of the exhaust gas emissions from the exhaust system of an internal combustion engine and control it to the appropriate temperature, timing, quantity of flowing, etc., for re-circulating the exhaust gas emissions back to the air intake system. Thus, the combustion temperature of mixture is lowered, and finally NOx emissions which constitute a toxic substance (NO and NO2 of nitrogen oxides) produced as a byproduct of the combustion is suppressed.

Such exhaust gas re-circulation control has been conventionally prohibited during so-called idling, when the accelerator is closed, so as to prevent deterioration of driveability and engine stalling.

However, in recent years, accompanying tightening of exhaust gas emission regulations, exhaust gas re-circulation control has been performed as part of studies for the further reduction of NOx exhaust gas emissions.

Conventionally, as devices which perform exhaust re-circulation control even during engine idling, the devices described in Japanese patent application laid-open No. 2-169853 and in Japanese patent application laid-open No. 63-97862 are well known.

For example, the device described in Japanese patent application laid-open No. 2-169853 is directed to diesel engine control which memorizes quantity of exhaust re-circulation at the time when an automobile running condition is hanged from normal running to the engine deceleration on idling state and continues to control the exhaust re-circulation quantity for the specified duration of time depending on the quantity of exhaust re-circulation at that time.

Another device described in Japanese patent application laid-open No. 63-97862 also relates to diesel engine control, which controls the quantity of exhaust re-circulation depending on degree of variation in the correction speed when the correction speed for controlling engine speed to the specified value during idling or low engine speed changes.

Thus, appropriate reduction in the amount of NOx in exhaust gas emissions is attained through use of the exhaust re-circulation control even when the engine is idling.

The internal combustion engines that conventional exhaust re-circulation control devices were designed for are diesel engines, and, although exhaust gas emissions control can be improved through use of conventional exhaust re-circulation control devices, the cleaning ratio of catalytic converters for gasoline engines has not been taken into account at all.

Therefore, even if the conventional re-circulation control devices are used for gasoline engines, optimal emissions cannot always be obtained. In particular, even if devices are adapted for gasoline engines like the one described in Japanese patent application laid-open No. 2-169853 which continue exhaust re-circulation control for a specified time after the engine switches to the idling state, HC emissions may adversely be increased. Also, when the gasoline engine is warming up, excessive re-circulation of exhaust gas emissions could occur, which could lead to deterioration of driveability and to engine stalling.

SUMMARY OF THE INVENTION

In view of the above, the primary objective of the present invention is to realize an exhaust re-circulation control device for an internal combustion engine, for gasoline engines in particular, which achieves efficient reduction of NOx in low-temperature idling ranges before the exhaust gases catalytic converter activates, while preventing deterioration of driveability and engine stalling.

The present invention is made based on the fact that, in order to maintain smooth rotation of an engine and to enable the engine to warm up as quickly as possible in low-temperature idling-ranges from when the engine starts at a cold temperature until it completely warms up, the engine needs to be operated at a high rotational speed level, which is called "fast idling." However, if the idling speed is high, exhaust gas emissions increase accordingly, and this also results in an increase in the volume of NOx emitted from the engine. On the other hand, if exhaust re-circulation control is performed under the conditions as above, the combustion temperature will drop and the volume of NOx emitted will decrease, causing the engine speed will become lower. If the engine speed becomes extremely low, it may lead to deterioration in driveability and to engine stalling.

According to the present invention, exhaust gas re-circulation quantity is controlled based on the idling target speed calculated within a low-temperature range before the catalytic converter is activated so that an optimal exhaust re-circulation quantity can be achieved and the volume of NOx emitted from the engine can be reduced to an optimal level without resulting in extremely low engine speed. Thus, idling speed, such as correcting the actual idling speed of the engine to an optimal value, can be controlled by way of control of the quantity of exhaust re-circulation. Further, the control can thus prevent deterioration of driveability and engine stalling, and also realize an efficient reduction of NOx before the catalytic converter is activated.

The present invention is further based on the fact that the catalytic converter is activated in the low-temperature idling-range, it is in a state wherein it cannot provide a sufficient cleaning ratio. However, when "fast idling" is used as above, the converter's cleaning ratio gradually increases as the engine warms up.

Preferably, if the exhaust re-circulation valve control means is constructed to calculate the target re-circulation quantity for exhaust gas emissions, which increases and decreases according to the target idling speed, in consideration of the cleaning ratio of the catalytic converter, the exhaust re-circulation control device for gasoline engines can also improve emissions in the desirable manner corresponding to the variation in the catalytic converter cleaning ratio in the low-temperature idling range.

More preferably, if the exhaust re-circulation valve control means is comprised of (a) the basic re-circulation quantity calculation means which calculates a basic value for exhaust emission re-circulation quantity in consideration of the cleaning ratio of the catalytic converter for exhaust gas emissions which increase and decrease according to the target idling speed, (b) the correction value calculation means for calculating a correction value for improving and consolidating engine rpm control by the idling rpm control means based on the differential between the target idling rpm and the actual engine speed, and (c) the target re-circulation quantity calculation means which calculates the target re-circulation quantity for exhaust gas emissions by the correction value for the basic re-circulation quantity, then the target re-circulation quantity will be varied according to the speed differential in cases when the engine speed cannot achieve the target idling speed resulting from the exhaust emission control by the target re-circulation quantity or even if the engine speed can achieve the targeted speed, but the targeted speed is slow, i.e., the exhaust re-circulation valve control means can set the engine speed at the target idling rpm quickly.

More preferably, if the exhaust re-circulation control means comprises means which will shut off the exhaust re-circulation valve for a specified period of time after the start of the engine and prevent re-circulation of exhaust gases, stable engine start can be ensured.

Still more preferably, if the exhaust re-circulation control means comprises means which will shut off the exhaust re-circulation valve while the fuel supply to the engine is cut off and prevent re-circulation of the exhaust gases, increase of HC (and its accompanying unstable combustion) is prevented, and also the constant optimal emissions level is maintained.

Still more preferably, the catalytic converter detection means can comprise means to detect whether the catalytic converter is active or inactive based on the coolant temperature at start of the engine and the elapsed time since the start of the engine, or the means can comprise means equipped with a catalytic converter temperature sensor for detecting the temperature of the catalytic converter and to detect whether or not the catalytic converter is active based the temperature detected by the catalytic converter temperature sensor. Both of the above configurations can precisely detect whether or not the catalytic converter is active.

BRIEF DESCRIPTION OF THE ACCOMPANYING DRAWINGS

Figure 17:
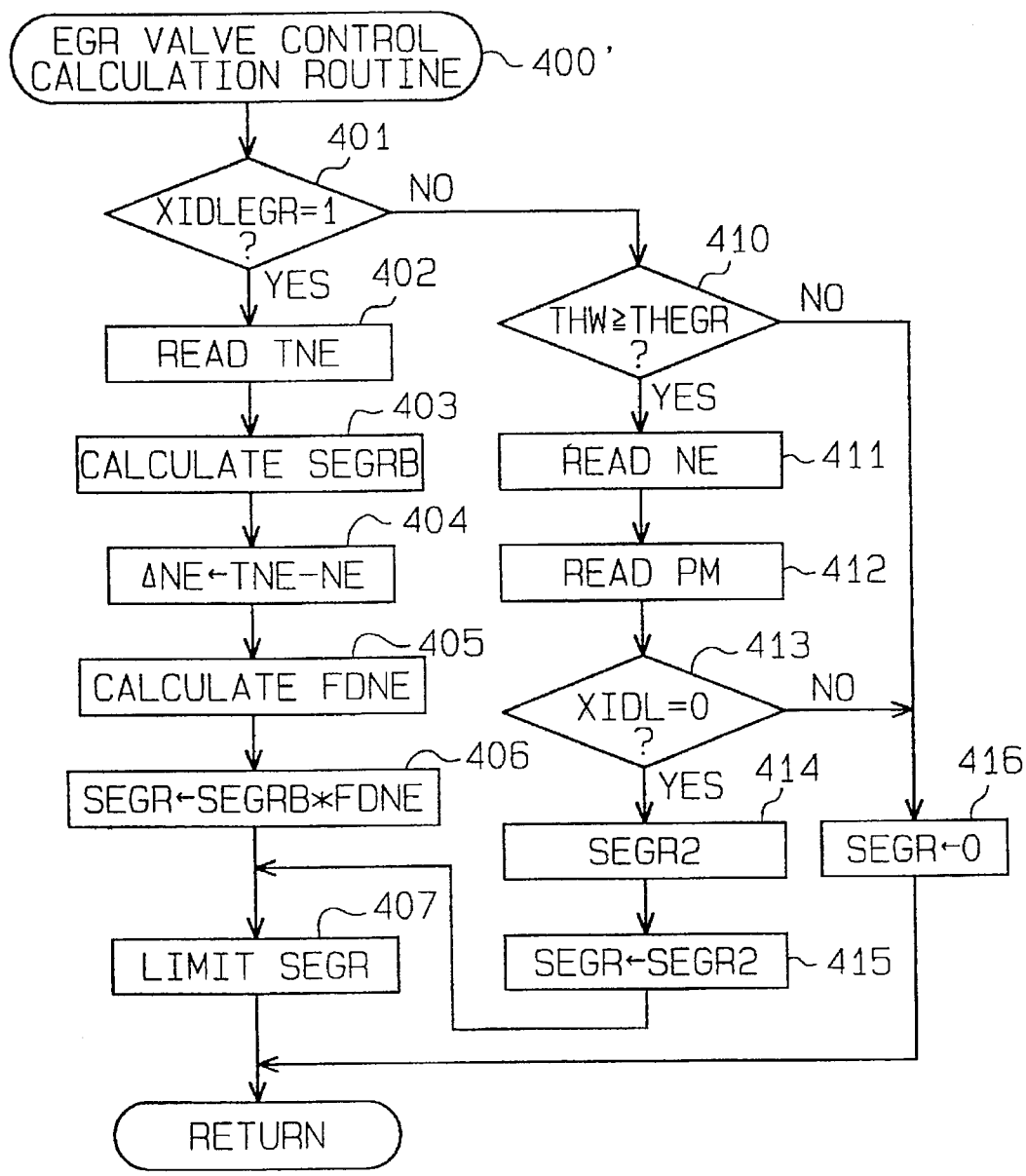
Figure 18:
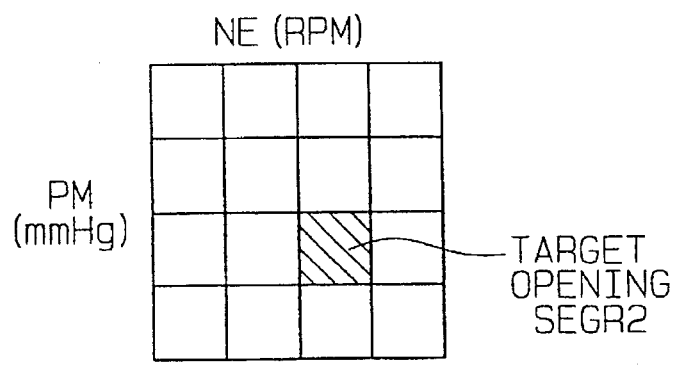

FIGS. 16(a) through 16(i) are time charts illustrating EGR control mode in the embodiment;

FIG. 17 is a flow chart illustrating a different embodiment of the EGR valve control ratio calculating routine; and FIG. 18 is a graph used for calculating the target EGR valve opening after the engine warms up.

DETAILED DESCRIPTION OF THE PRESENTLY PREFERRED EMBODIMENT

Figure 1:
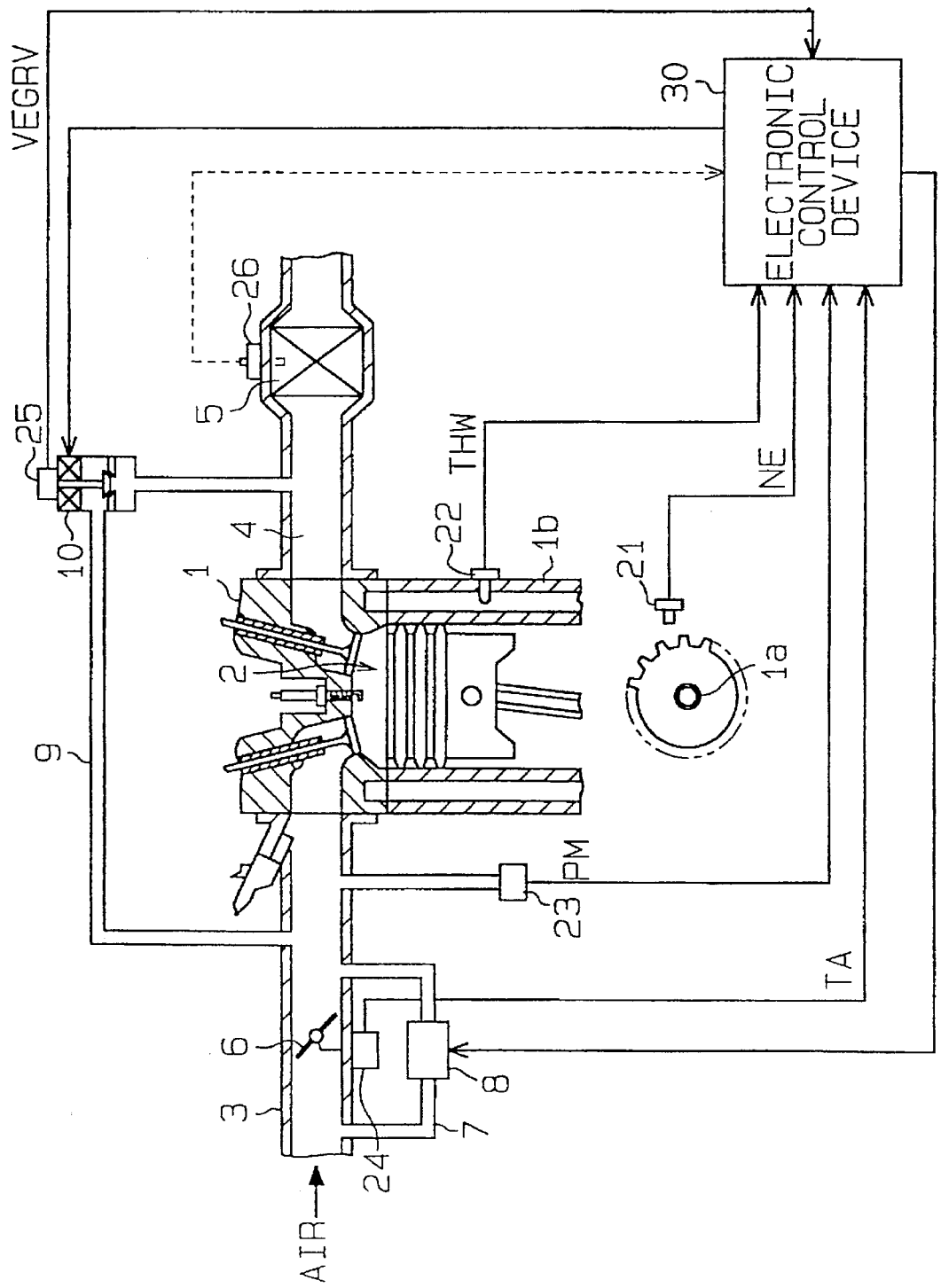
FIG. 1 is a block diagram illustrating an EGR control device according to an embodiment of the present invention.

FIG. 1 illustrates an embodiment of an exhaust re-circulation control device for internal combustion engines according to the invention.

The exhaust re-circulation control (hereinafter referred to as "EGR control") device is designed for gasoline engines to efficiently reduce NOx emissions in the low-temperature idling range before the catalytic converter becomes active, while preventing deterioration of driveability and engine stalling.

First, the configuration of the device is described with reference to FIG. 1.

In FIG. 1, an air intake passage 3 and an exhaust passage 4 connected to a combustion chamber 2 are provided in an engine unit 1 of a gasoline engine.

The exhaust passage 4 has a catalytic converter 5 which cleans toxic substances (CO, HC, NOx) contained in exhaust gas emissions produced by the combustion of mixture gas in the combustion chamber 2. In the air intake passage 3, a throttle valve 6 opens and closes in linkage with accelerator operation (which is not illustrated in the figure).

On the other hand, the air intake passage 3 has a bypass passage 7 which bypasses throttle valve 6 to connect upstream and downstream thereof. Bypass passage 7 has an idling speed control valve (hereinafter referred to as an "ISC valve") 8 which is operated by a stepping motor. The opening of the ISC valve 8 is adjusted to control the engine speed during idling at a desired target idling speed level.

On the other hand, the exhaust passage 4 has an EGR passage 3 which re-circulates a portion of the exhaust gas emissions to the downstream side of the throttle valve in the air intake passage 3. The EGR passage 9 also has an EGR valve 10 which acts as exhaust re-circulation valve operated by the stepping motor. The EGR control adjusts the opening of the EGR valve 10 to control the EGR quantity (ratio) at a desired value.

As a group of sensors for detecting operating condition of the engine, crank shaft 1a is associated with a rotation angle sensor 21 which outputs signals synchronized with the engine rotation and the cylinder block 1b has a coolant temperature sensor 22 which detects the temperature of the engine coolant.

As for sensors, the air intake passage 3 has an intake air pressure sensor 23 which detects intake air pressure for the engine, while the throttle valve 6 has a throttle opening sensor 24 which detects the opening of the throttle valve.

In addition, the EGR valve 10 has an EGR valve opening sensor 25 which detects the opening of the EGR valve. Detection signals from those sensors are sent to an electronic control device 30.

The electronic control device 30, for example, has a microprocessor and performs centralized control for the ISC valve 8 and the EGR valve 10 based on the detection signals sent from each sensor.

Figure 2:
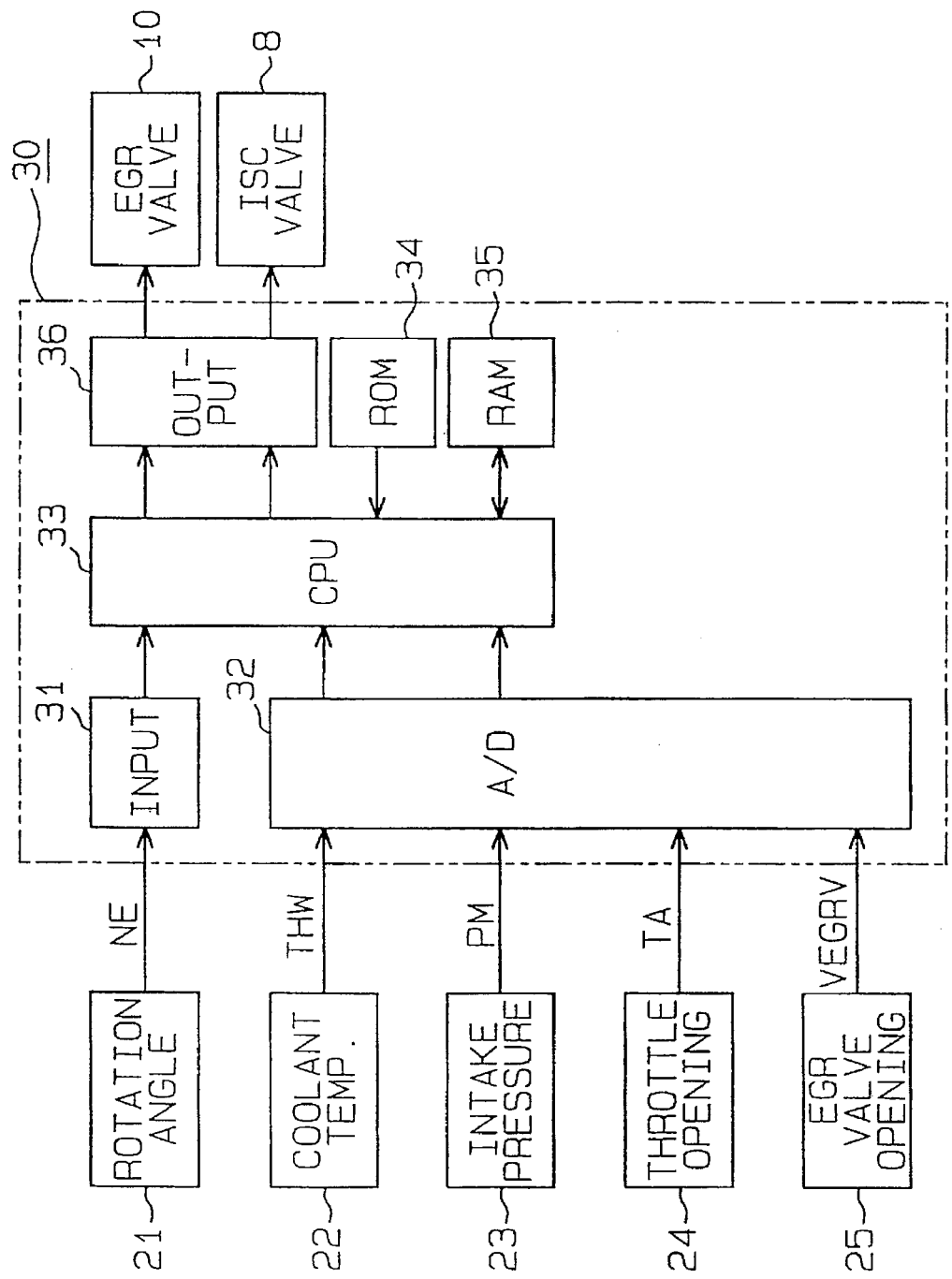
FIG. 2 is a block diagram which outlines the configuration of the electronic control device shown in FIG. 1.

FIG. 2 shows the electric wiring configuration of the electronic control device 30.

As shown in FIG. 2, the electronic control device 30 is comprised of an input circuit 31, an A/D converter 32, a CPU (central processing unit) 33, a ROM (read-only memory) 34, a RAM (random access memory) 35 and an output circuit 36.

The CPU 33 detects an engine speed (rpm) NE based on the detection signal from the rotation angle sensor 21 which is input via the input circuit 31 (in FIGS. 1 and 2 the detection signal from rotation angle sensor is abbreviated as NE).

The coolant temperature THW, intake pressure PM, throttle opening TA and EGR opening VEGRV are detected based on the respective detection signals from the coolant temperature sensor 22, the intake air pressure sensor 23, the throttle opening sensor 24 and the EGR valve opening sensor 25 (in FIGS. 1 and 2, the detection signals from the respective sensors are abbreviated as THW, PM, TA and VEGRV).

The CPU 33 calculates a target EGR valve opening SEGR based on information provided by the respective sensors and controls opening for the EGR valve 10 via the output circuit 36.

In the same manner as above, the CPU 33 calculates a target idling rpm TNE based on sensor information and, at the same time, generates the opening command value SISC for the ISC valve 8, to obtain the approximate engine rpm. Next, the CPU 33 controls the opening of the ISC valve 8 via the output circuit 36 based on the opening command value SISC.

In the electronic control device 30, the ROM 34 is a memory in which control programs, data maps, etc., described in the below are permanently stored, while RAM 35 is a memory which temporarily memorizes various data, flags, etc.

FIGS. 3 to 15 shows an example of the EGR control procedure for the device which is performed by the electronic control device 30. A further explanation for the EGR control employed in the control device are given in the below using FIGS. 3 through 15.

Figure 3:
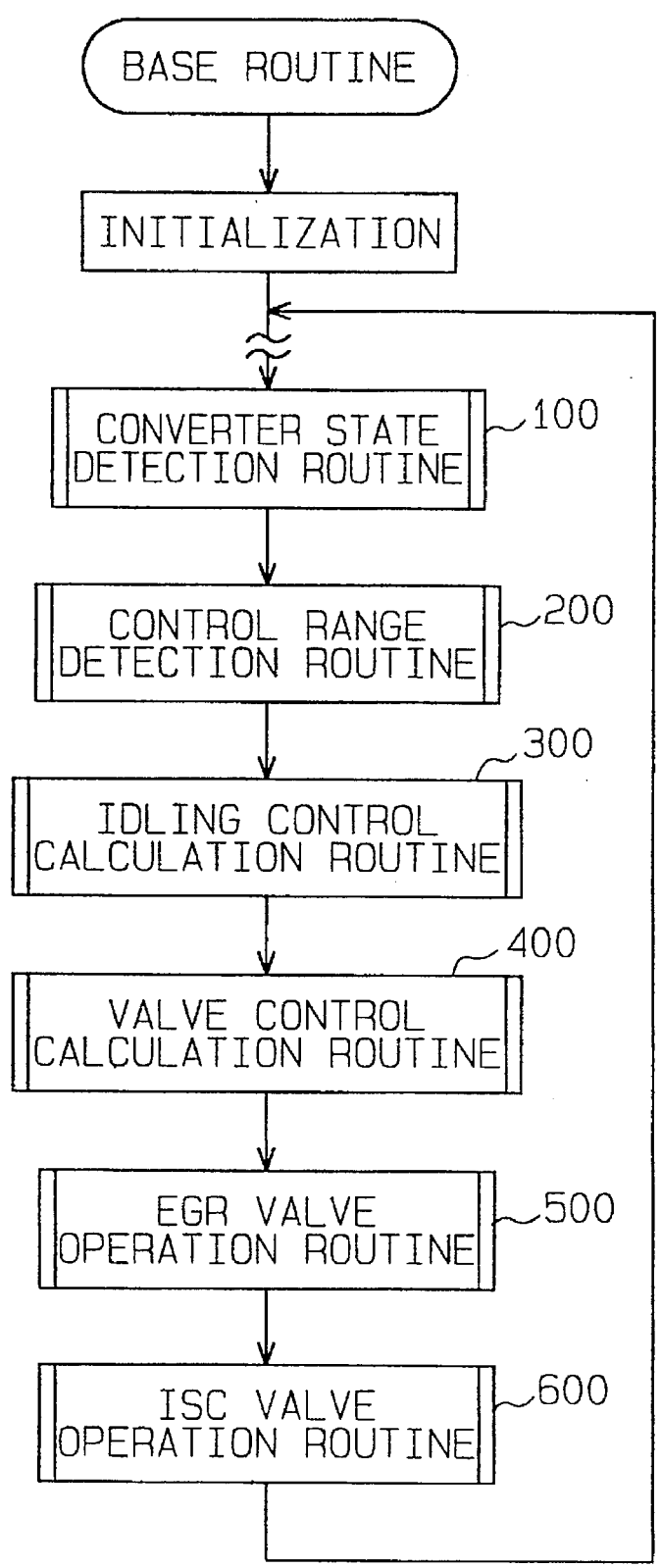
FIG. 3 is a flow chart illustrating an EGR control base routine in the embodiment.

FIG. 3 shows the base routine executed by the CPU 33 above for the electronic control device 30.

The base routine is activated on turning the power on. Once the base routine is activated, the CPU 33 first initializes the memories, then executes the subroutines in steps 100 to 600 at the corresponding processing cycle for the respective subroutines.

More precisely, the CPU 33 detects whether or not catalytic converter 5 is active in a catalytic converter operating state detection routine in step 100, then it detects whether the engine operating state is in the permissible idling rpm control range or not and also whether it is in the permissible EGR control range or not, in a control range detection subroutine in step 200.

The CPU 33 calculates a control quantity (feedback control value SISC or open loop control value SOP) for the ISC valve 8 for controlling the idling rpm to the desired engine rpm by an idling rpm control quantity calculating routine in step 300, and calculates a control quantity (opening command value SEGR) for controlling to achieve the optimal EGR ratio by a valve control ratio calculating routine in step 400.

The CPU 33 operates the EGR valve 10 to the target opening SEGR using an EGR valve operation routine in step 500, and sets the ISC valve 8 to the specified opening according to the amount of control for the ISC valve 8 set by an ISC valve operation routine in step 600.

In the base routine, the routines in steps 100 to 400 are executed at a 30 ms cycle and the routines in steps 500 and 600 are executed at a 4 ms cycle.

Figure 4:
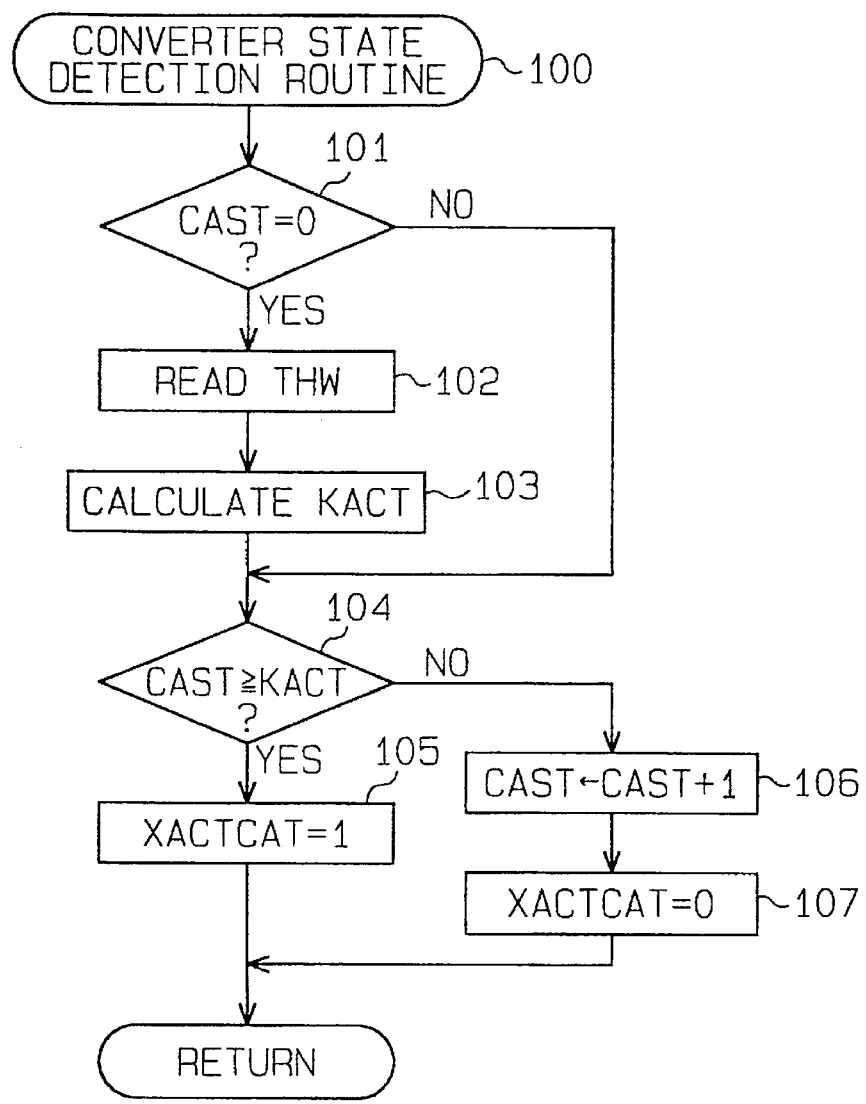
FIG. 4 is a flow chart illustrating a routine for detecting whether or not the catalytic converter is active.
Figure 5:
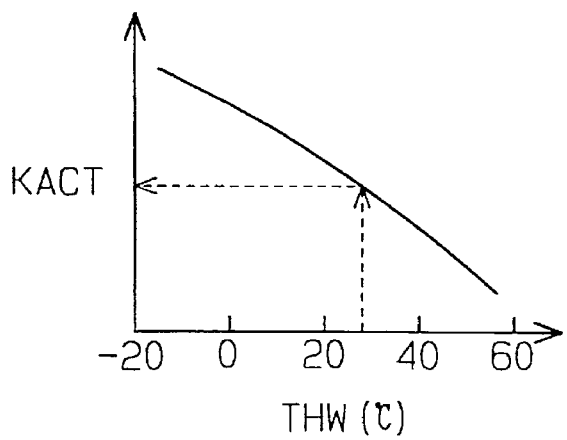
FIG. 5 is a graphic map illustrating the relationship between coolant temperatures and activation time of a catalytic converter.

The processing details used for the respective routines are described below using FIG. 4 and subsequent figures. First, the catalytic converter operation state detection routine 100 is described using FIG. 4.

In the catalytic converter state detection routine 100, the CPU 33 determines whether or not the catalytic converter 5 is active based on the coolant temperature THW when the engine starts and the elapsed time CAST after the engine starts.

That is, in the catalytic converter state detection routine 100, the CPU 33 reads the coolant temperature THW in step 102 when the elapsed time CAST is set for "0" in step 101, then the CPU 33 calculates the estimated catalytic converter activation time KACT depending on the coolant temperature THW by reference to coolant temperature data map (table).

Next, the CPU 33 detects whether a counter value for the elapsed time CAST reaches the estimated catalytic converter activation time KACT or not in step 104. If the CAST has reached KACT (CAST≧KACT), the CPU 33 sets the catalytic converter activation detection flag XACTCAT (XACTCAT=1) in step 105.

On the other hand, as a result of the above detection means, if the elapsed time CAST has not reached the estimated catalytic converter activation time KACT, the CPU 33 increments the counter value in step 106 and maintains the catalytic converter activation detection flag XACTCAT at "0" (XACTCAT=0) in step 107.

As mentioned above, only when the routine is executed after the engine has started is the assessed catalytic converter activation time KACT calculated based on the coolant temperature THW described in steps 102 and 103. When the counter value for the elapsed time CAST reaches the assessed activating time KACT, the catalytic converter activation detection flag XACTCAT is set.

Figure 6:
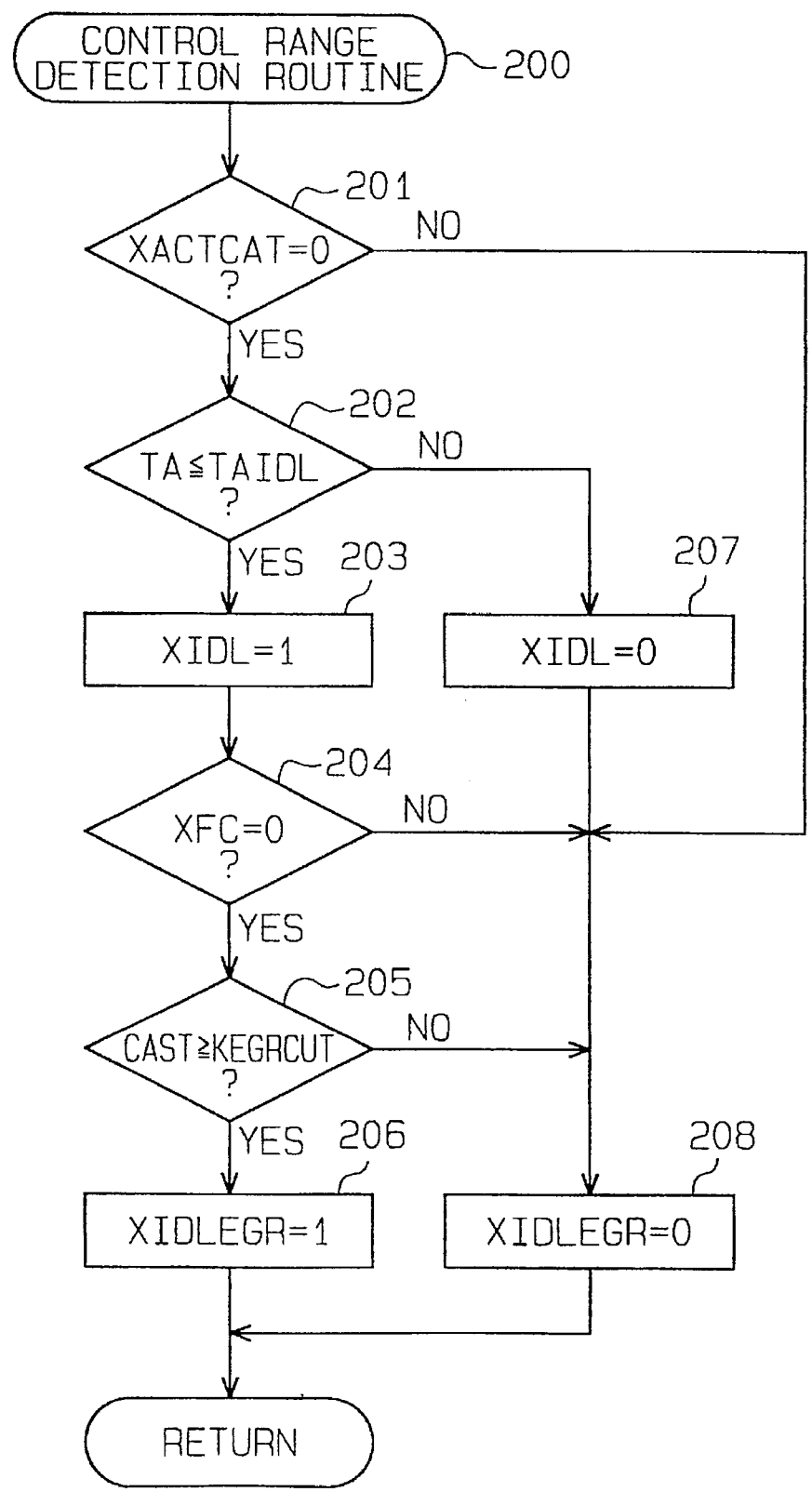
FIG. 6 is a flow chart illustrating an EGR control range detection routine.

Next, the control range detection routine 200 is explained using FIG. 6.

Control range detection routine 200 detects whether the engine operating state is in the permissible idling rpm control range or not and whether the engine is in the permissible EGR control range or not based on the state of the catalytic converter activation detection flag XACTCAT.

More precisely, by control range detection routine 200, the CPU 33 detects whether catalytic converter 5 is active or not based on the setting for the flag XACTCAT in step 201. Under the condition that catalytic converter 5 is not active (i.e., ACTCAT=0), the CPU proceeds to step 202.

After the CPU 33 has detected that the catalytic converter 5 is not active, the CPU 33 checks whether or not the throttle opening TA is lower than the idling detection opening TA1DL in step 202. If the TA is lower than the TA1DL (TA≦TASDL), the CPU 33 determines that the engine is in the idling or the like state. If the CPU 33 determines that engine is in idling, the CPU 33 sets the idling detection flag XIDL (XIDL=1) in step 203.

After the CPU 33 has set the idling detection flag XIDL, next the CPU 33 detects whether the fuel supply to the engine is cut off or not, i.e., such as the condition immediately after the engine speed slows down, in step 204. The detection is performed based on the state of the fuel cut flag XFC which is set by a known fuel injection control section which is comprised of an electronic control device.

When the CPU 33 detects that the fuel supply is not cut off (XFC=0) in step 204, in the next step 205, it detects if the specified time KEGRCUT has elapsed since the engine started based on the counter value for the elapsed time CAST. It is to be noted that time KEGRCUT is set, for example at 20 seconds, to improve the engine starting performance by prohibiting EGR right after the engine starts.

When all the conditions mentioned above are met, the CPU 33 sets the EGR permit flag XIDLEGR (XIDLEGR=1) during idling in step 206. If the idling condition is not met in step 202, the idling detection flag XIDL is maintained as "0" in step 207, at the same time even if one of the above conditions is not met, the CPU 33 prohibits EGR from being executed (XIDLEGR=0) in step 208.

Figure 7:
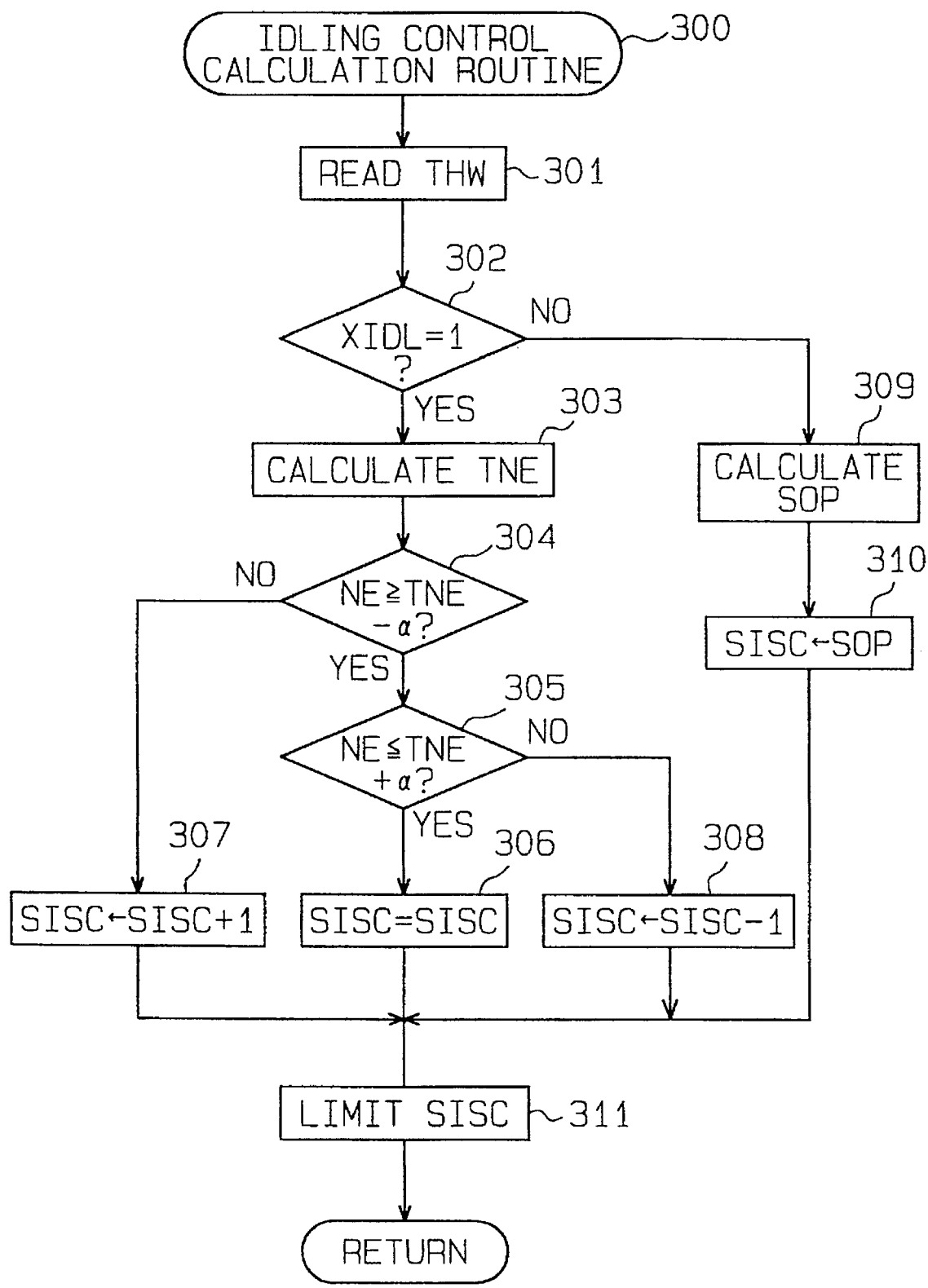
FIG. 7 is a flow chart illustrating an idling rpm control quantity calculating routine.

Next, the idling rpm control quantity calculating routine 300 is calculated using FIG. 7.

In idling rpm control calculating routine 300, the CPU 33 calculates the control quantity for ISC valve 8 for controlling the idling rpm at the target engine rpm level based on the idling detection flag XIDL.

More precisely, in idling rpm control quantity calculating routine 300, the CPU 33 first reads the coolant temperature THW in step 301, then detects whether the engine is idling or not based on the idling detection flag XIDL in step 302.

Figure 8:
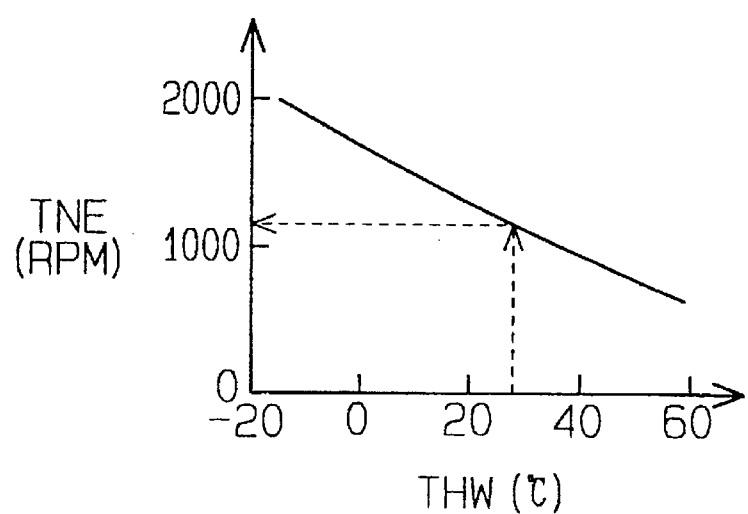
FIG. 8 is a graph illustrating the relationship between coolant temperatures and target idling rpm.

If the engine is detected as idling (XIDL=1), the CPU 33 calculates in step 303 the target idling rpm TNE, which is determined according to the current coolant temperature based on the coolant temperature table given in FIG. 8. The target idling rpm TNE is set at a comparatively high rpm level to accord with "fast idling".

In the following steps 304 and 305, the CPU 33 compares the current rpm of the engine with the target idling rpm TNE±α ("±α" represents the dead band value previously acquired by experiment for stabilizing the rpm) and determines the target ISC valve opening SISC. More precisely:
if the current rpm NE of the engine is within the target idling rpm, TNE±α, the CPU 33 maintains the current ISC valve opening SISC in step 306;
if the engine rpm NE is smaller than the target idling rpm TNE−α, the CPU 33 increments the current ISC valve opening SISC one step (SISC+1) in step 307; and
if the engine rpm NE is larger than the target idling rpm TNE+α, the CPU 33 decrements the current ISC valve opening SISC one step (SISC−1) in step 308.
Thus, the current ISC valve opening SISC is adjusted.

Figure 9:
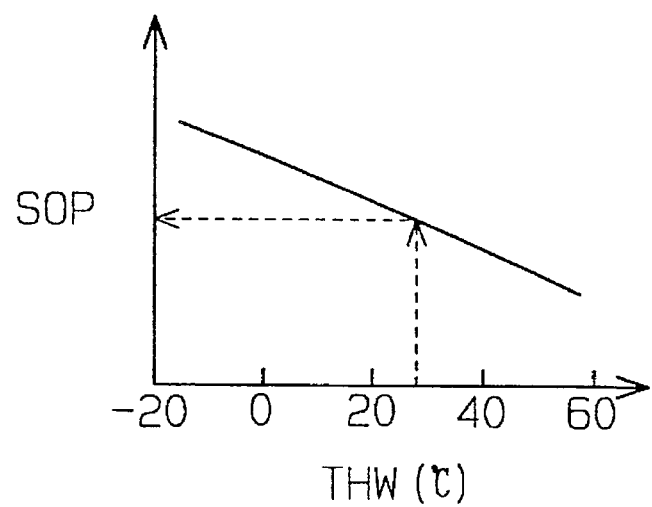
FIG. 9 is a graph illustrating the relationship between coolant temperatures and open-loop target ISC valve opening.

If the CPU 33 detects that the engine is not idling (XIDL=0) in step 302 above, in step 309 it calculates an open-loop target ISC valve opening value SOP determined according to the current coolant temperature THW based on the coolant temperature table given in FIG. 9. In this instance, the open-loop target ISC valve opening SOP thus calculated is substituted as the target ISC valve opening SISC (step 310).

After the CPU 33 has determined the above target ISC valve opening SISC, in final step 311, the CPU 33 limits the target ISC valve opening SISC within optimal upper and lower limit guards to compensate for the valve characteristics of ISC valve 8 and prevent electronic control device 30 from overflowing.

Figure 10:
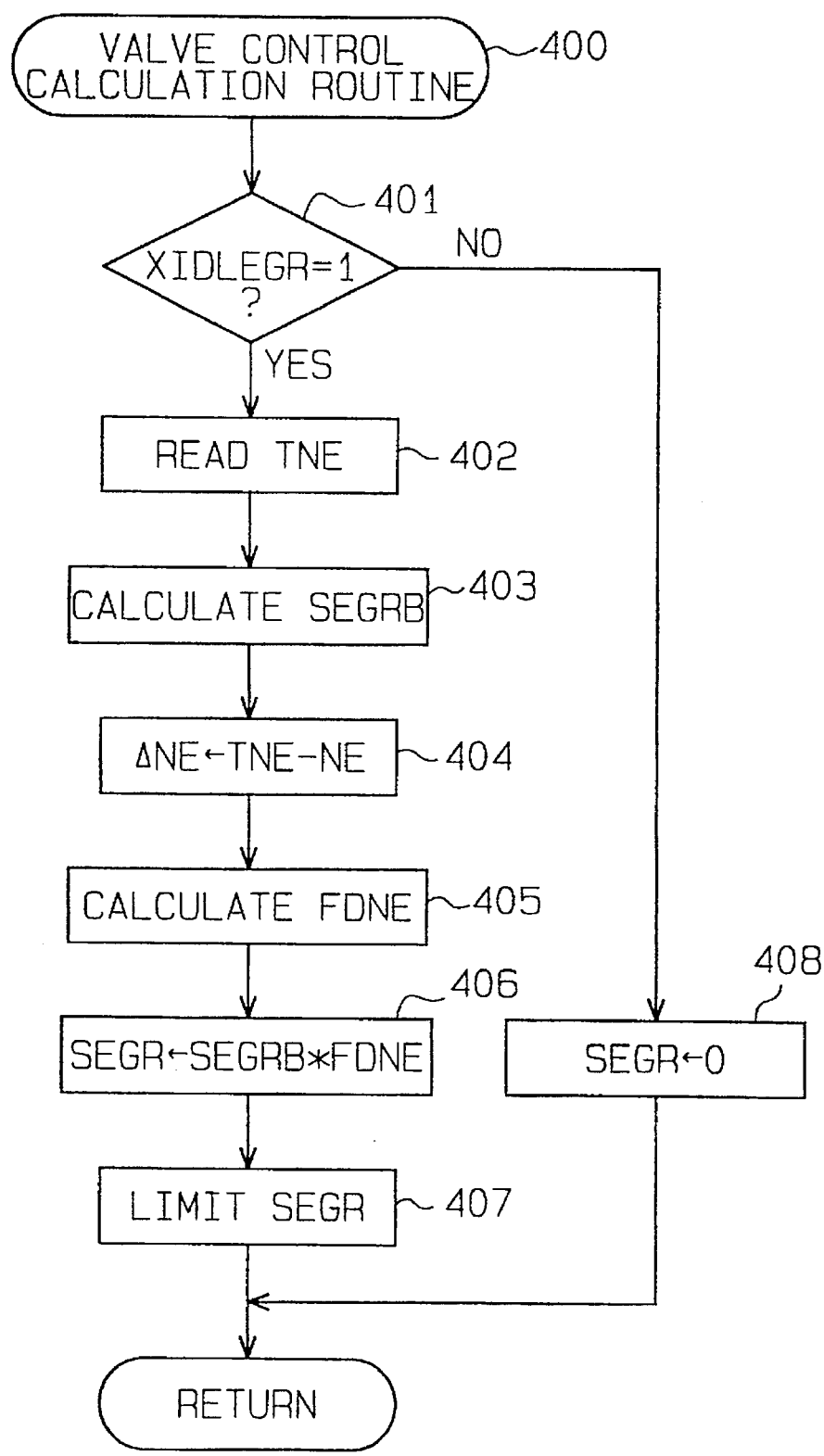
FIG. 10 is a flow chart illustrating an EGR valve control quantity calculating routine.

Next, EGR valve control quantity calculating routine 400 is explained using FIG. 10.

In the EGR valve control quantity calculating routine 400, the CPU 33 calculates the current control quantity for the EGR valve 10 based on the EGR allow flag XIDLEGR during idling and the target idling rpm TNE calculated above.

More precisely, in EGR valve control quantity calculating routine 400, the CPU 33 first determines whether execution of EGR is allowed or not based on the EGR allow flag XIDLEGR state in step 401.

Figure 11:
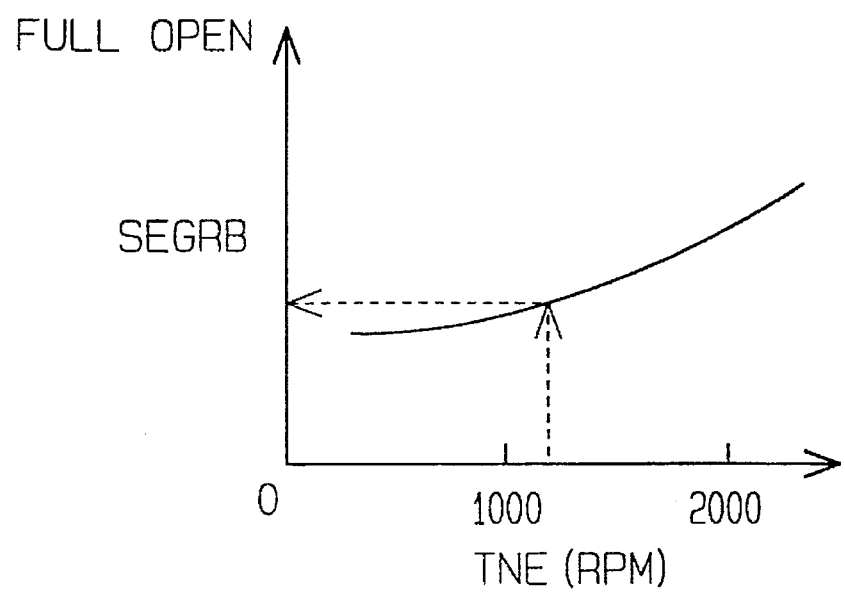
FIG. 11 is a graph illustrating the relationship between target idling rpm and basic EGR valve opening.

As a result of the above determination, if execution of the EGR is permitted (XIDLEGR=1), in step 402 the CPU 33 reads the target idling rpm TNE calculated above, and in the next step 403, it calculates a basic EGR valve opening SEGRB according to the current target idling rpm TNE based on the graph given in FIG. 11.

When the basic EGR valve opening SEGRB is based on the idling-condition, a load term does not change. That is, the basic valve opening SEGRB is determined by the target idling rpm TNE graph in FIG. 11 only. The graph is so set as that an EGR valve opening corresponds to the optimal EGR ratio previously acquired by experiments in consideration of changes in the cleaning ratio of the catalytic converter 5 in relation to exhaust gas emissions which increase/decrease according to the current target idling rpm TNE.

Figure 12:
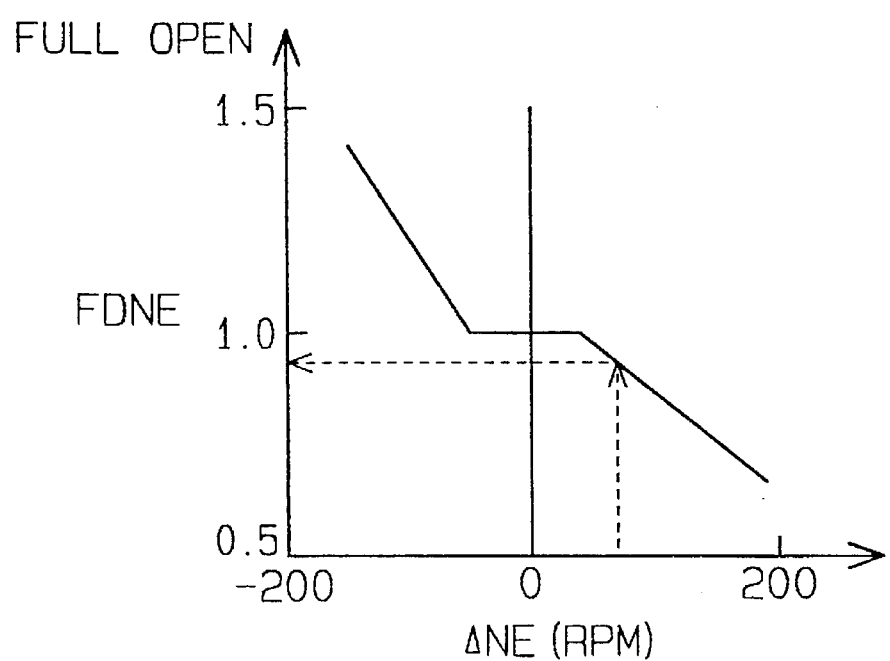
FIG. 12 is a graph illustrating the relationship between idling rpm deviation and EGR valve correction value for rotation correction.

After the CPU 33 calculated the basic EGR valve opening SEGRB as above, the CPU 33 acquires a differential ΔNE between the target idling rpm TNE and the actual engine rpm NE in step 404, then in step 405 the CPU 33 calculates an EGR valve correction value FDNE for rotation correction which is determined according to the current rpm differential ΔNE based on a correction table in FIG. 12.

The correction value FDNE is a correction value for the EGR ratio in order to achieve high speed zeroing in if the engine rpm NE cannot zero-in on the target idling rpm TNE through control by the ISC valve 8 only or if zeroing in takes an excessively long time.

After the CPU 33 has obtained the EGR valve correction value FDNE for rotation correction, CPU 33 executes in step 406 multiplication as:

SEGR←SEGRB XFDNE based on the basic EGR valve opening SEGRB calculated above and the correction value FDNE, to determine a final EGR valve opening SEGR.

After the CPU 33 has determined the final EGR valve opening SEGR, in step 407 the CPU 33 limits the EGR valve opening SEGR within the optimal upper and lower limit guards to compensate the valve characteristics for the EGR valve 10 and to prevent electronic control device 30 having the microprocessor from overflowing.

If the CPU 33 detects that the EGR is not allowed (XIDLEGR=0) during idling in step 401 above, the CPU 33 substitutes "0" in the final EGR valve opening SEGR (SEGR←0) in step 408 and executes the processing to close the EGR valve 10.

Figure 13:
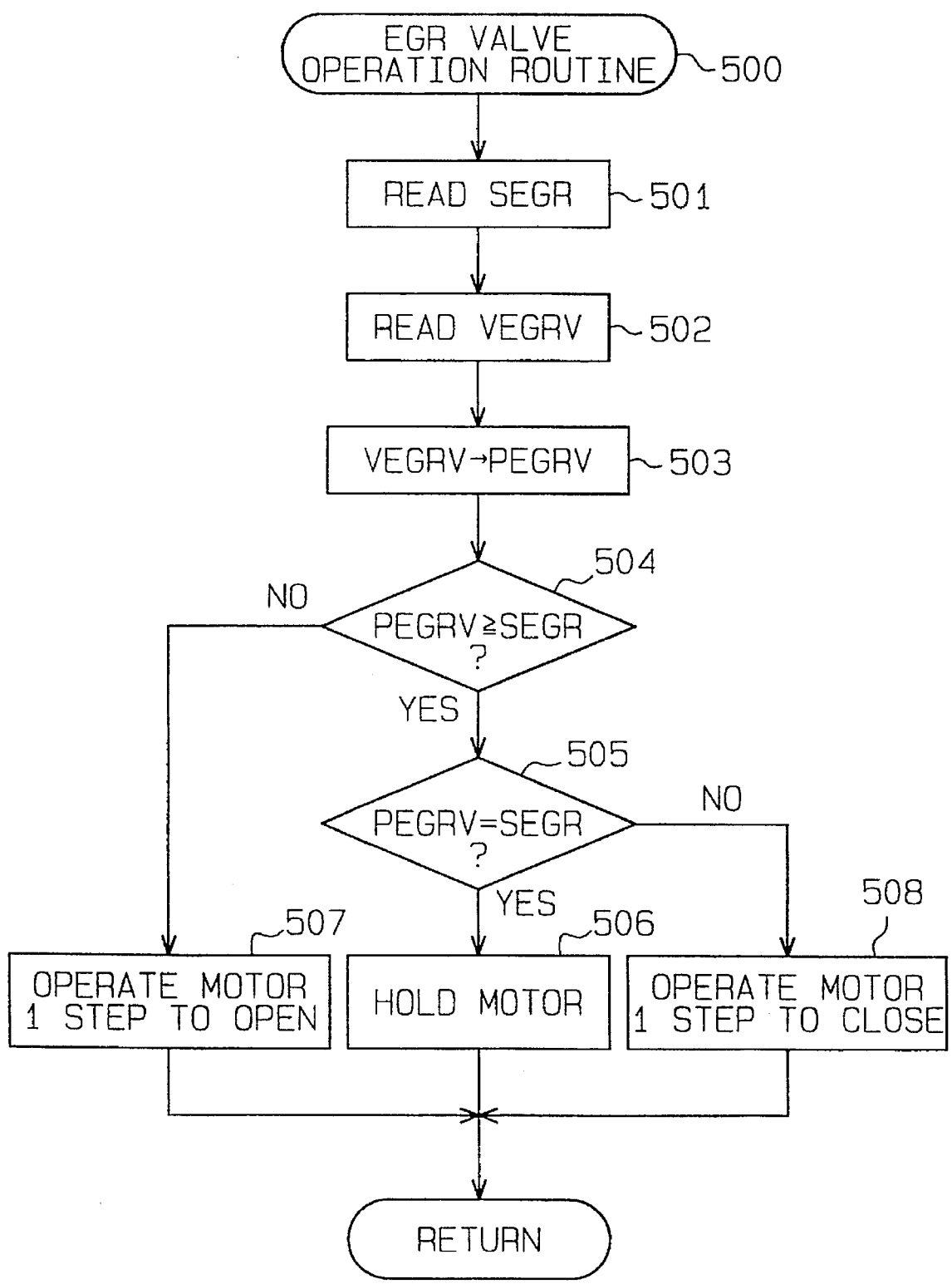
FIG. 13 is a flow chart illustrating an EGR valve operation routine.

Next, EGR valve operation routine 500 is described by using FIG. 13.

In the EGR valve operation routine 500, the EGR valve 10 is actually operated or driven based on the final (target) EGR valve opening SEGR set as above.

More precisely, in the EGR valve operation routine 500, the CPU 33 first reads the target EGR valve opening SEGR in step 501, then in the next step 502, the CPU 33 reads an output VEGRV of the EGR valve opening sensor 25 linked with the EGR valve shaft. It is to be noted, however, that the output VEGRV of the sensor 25 is a voltage value, which cannot be directly compared with the value for the target EGR valve opening SEGR.

Figure 14:
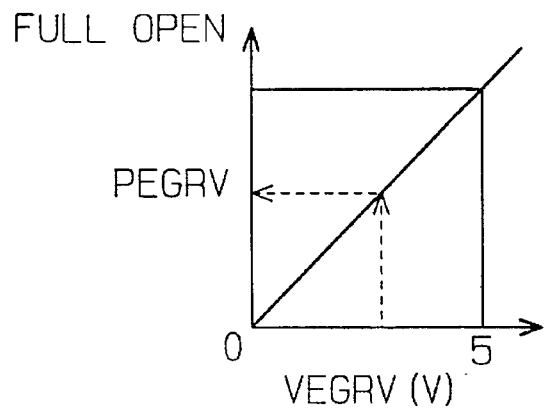
FIG. 14 is a graph illustrating an EGR valve opening sensor value (voltage value) conversion table.

For the above reason, the CPU 33 converts the output VEGRV (voltage value) of the EGR valve opening sensor 25 into the actual valve opening PEGRV of the EGR valve 10 based on a conversion graph shown in FIG. 14.

After the CPU 33 has obtained the PEGRV which is a value indicating the actual valve opening of the EGR valve 10 in the same unit as the target EGR valve opening SEGR, CPU 33 compares the target valve opening SEGR with the actual valve opening PEGRV in steps 504 and 505 to operate or drive the EGR valve 10 in a direction to reduce the differential.

More precisely, the EGR valve 10 is actually operated in the following manner:

if the actual valve opening PEGRV equals the target valve opening SEGR, the CPU 33 holds the operation condition of the stepping motor for the EGR valve 10 in step 506;

if the actual valve opening PEGRV is smaller than the target valve opening SEGR, the CPU 33 operates the stepping motor for the EGR valve 10 one step to the opening side in step 507; and if the actual valve opening PEGRV is larger than the target valve opening SEGR, the CPU 33 operates the stepping motor for the EGR valve 10 one step to the closing side in step 508. Even if there is a differential between SEGR and PEGRV, the differential can be gradually reduced by repeating the routine 500.

Figure 15:
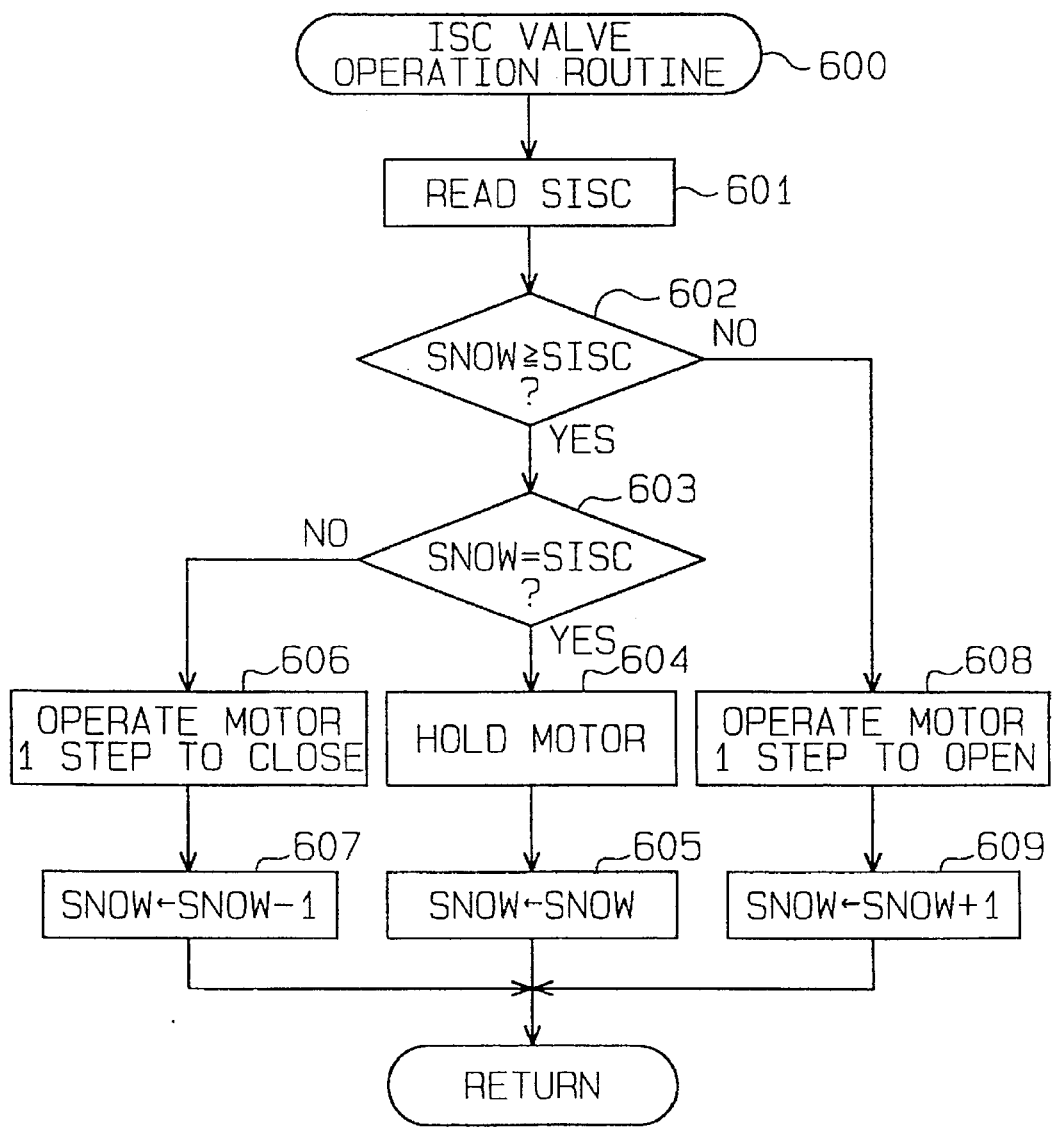
FIG. 15 is a flow chart illustrating an ISC valve operating routine.

The ISC valve operation routine 600 is explained next by using FIG. 15.

The ISC valve operation routine 600 operates ISC valve 8 based on the target ISC value opening SISC.

More precisely, in ISC valve operation routine 600, the CPU 33 reads in the target ISC valve opening SISC in step 601. Then, in steps 602 and 603, the CPU 33 compares an ISC valve motor operation counter value SNOW (i.e., actual valve opening of ISC valve 8) with the target ISC valve opening SISC, then operates the ISC valve 8 to reduce the differential.

More precisely, the CPU 33 operates ISC valve 8 in the following manner:

if the counter value SNOW equals the target valve opening SISC, the CPU 33 holds stepping motor operation of the ISC valve 8 in step 604 and the CPU 33 also holds the counter value SNOW in step 605.

if the counter value SNOW is larger than the target valve opening SISC, the CPU 33 operates the stepping motor of ISC valve 8 one step to the closing side in step 606, and the CPU 33 decrements the counter value SNOW in step 607 (SNOW←SNOW−1); and if the counter value SNOW is smaller than the target valve opening SISC, the CPU 33 operates the stepping motor of the ISC valve 8 one step to the opening side in step 608, and the CPU 33 increments the counter value SNOW in step 608 (SNOW←SNOW+1).

In this instance if there is a differential between the target valve opening SISC and the actual valve opening (valve motor operation counter value) SNOW, the differential will be gradually reduced by repeating the operation routine 600. Particularly in the device in the embodiment, the CPU 33 acquires the EGR valve correction value FDNE for rotation correction in EGR valve control ratio calculating routine 400 shown in FIG. 10 to correct the basic EGR valve opening SEGRB by the acquired FDNE, so that the differential will definitely be reduced at high speeds.

Figure 16:
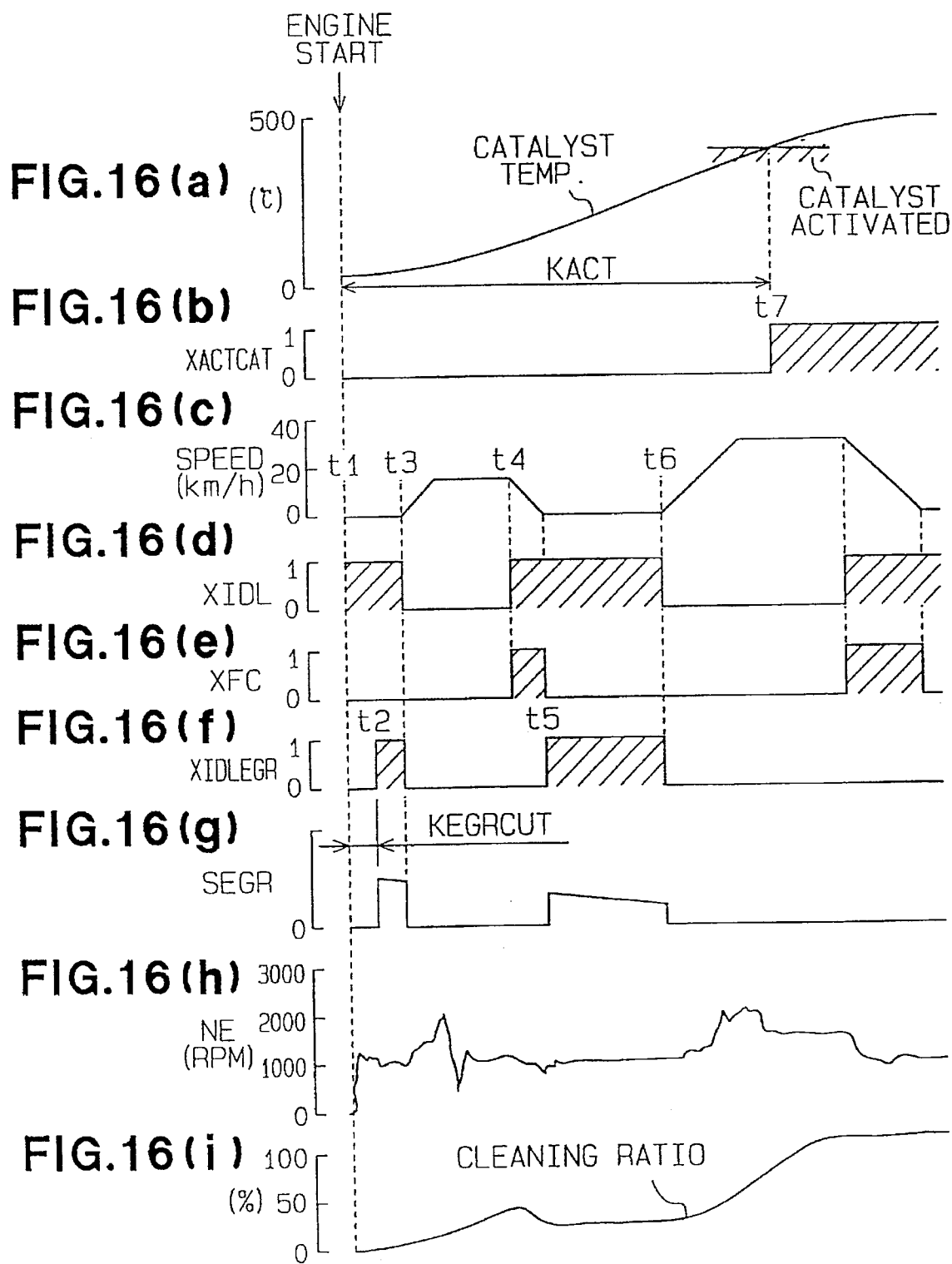

FIGS. 16(a) through 16(c) illustrate how EGR control by the device is executed by the processing undertaken by the electronic control device 30 (the CPU 33) described above. By executing EGR control as above, NOx emissions can be efficiently reduced even in the low-temperature idling range before the catalytic converter is activated.

FIG. 16(a) shows temperature transition of catalytic converter 5, FIG. 16(b) shows the state of the catalytic converter activation detection flag XACTCAT, and FIG. 16(c) shows transition of driving speeds when the pertinent automobile is running according to the driving pattern in the European mode. FIG. 16(d) shows the state of the idling detection flag XID corresponding to transition of driving speeds, FIG. 16(e) shows the state of the fuel cut flag XFCL corresponding to transition of driving speeds. FIG. 16(f) shows the state of idling EGR allow flag XIDLEGR and FIG. 16(g) shows transition of the target EGR valve opening SEGR. FIG. 16(h) shows transition of the engine rpm NE and FIG. 16(i) shows transition of the catalytic converter cleaning ratio.

If the engine is started at time t1, for example, the engine idling state is detected during the period of time after the engine has started at t1 until time t3 when the automobile starts moving (see FIG. 16(d)). However, the idling EGR is prohibited during the specified time KEGRCUT (e.g. 20 sec.) The idling EGR is executed only while the engine idling state is being detected after time t2 when time KEGRCUT has elapsed (refer to FIG. 16(f) and (g)). It is to be noted that time KEGRCUT is set to increase starting performance of the engine as above.

After the automobile starts moving, detection of idling state is canceled. Detection of the engine idling state starts again at time t4 when the automobile starts decelerating (see FIG. 16(d)). While the automobile is decelerating, the fuel supply is cut off and the idling EGR is also prohibited. Thus, the idling EGR is restarted at time t5 when fuel supply cut is canceled (refer to FIG. 6(f) and 6(g)). It is to be noted that prohibiting the EGR while the fuel is cut off, prevents an increase of HC which is accompanied by unstable combustion and also maintain optimal emissions.

The idling EGR continues until time t6 when the automobile starts accelerating again. While the EGR is being executed (between time t2 to t3 and t5 to t6), the amount of EGR (target EGR valve opening SEGR) is optimized to prevent deterioration of driveability and engine stalling and to efficiently reduce NOx as shown in FIG. 16(g) according to the engine rpm NE, or the target idling rpm TNE, or the cleaning ratio of the catalytic converter 5 which increases gradually as shown in FIG. 16(i).

As described previously, catalytic converter activation time KACT is estimated by table depending on the coolant temperature THW at starting of the engine. The estimated time KACT is normally a value which is set according to the driving mode of the automobile. If the automobile is driven in the European mode, for example, and the coolant temperature at starting is 25° C., the estimated time KACT is set around 100 seconds.

As above, with the device in the example, the amount of EGR is always controlled to a value corresponding to the target idling rpm so that NOx can be reduced efficiently while preventing deterioration of driveability and engine stalling even in the low-temperature idling range even before the catalytic converter is activated.

According to the device in the embodiment, whether catalytic converter 5 is active or not is detected based on the coolant temperature THW after the engine starts and elapsed time CAST since then (CAST≧KAST). Alternatively, by installing a catalytic converter temperature sensor 26 in the catalytic converter 5 as shown by dotted lines in FIG. 1, whether catalytic converter 5 is active or not can be directly detected based on the temperature detected by the sensor 26. If the device is configured as this, the catalytic converter state can be detected more precisely.

According to the device in the embodiment, as it is obvious from the control detection routine 200 in FIG. 6, EGR control is allowed only during the fast idling. However, after the engine warms up, it may of course switch to the normal EGR control so that the EGR can be operated in the entire ranges. The EGR valve control ratio calculating routine at this point is shown in FIG. 17 as routine 400'.

As shown in FIG. 17, EGR valve control ratio calculating routine 400' is a combination of the EGR valve control ratio calculating routine 400 shown in FIG. 10 with additional processing in step 410 and subsequent steps. In this instance, after the CPU 33 detects that the idling EGR is not allowed in step 401, it sets the target EGR valve opening SEGR during the normal EGR control by the following procedures.

More precisely, in the EGR valve control ratio calculating routine 400', when the CPU 33 detects that the idling EGR is not allowed in step 401, the CPU 33 detects whether the coolant temperature THW is higher than a specified EGR start temperature THEGR (e.g. 60° C.) in step 410. If the coolant temperature THW is higher the EGR start temperature THEGR, the CPU 33 reads in the engine rpm NE and engine intake pressure PM in steps 411 and 412. Then, if the CPU 33 detects that the engine is not idling (XIDL=0) in step 413, the CPU 33 calculates the target EGR valve opening SEGRZ for the normal EGR control based on the data map shown in FIG. 18 in step 414. The target EGR valve opening SEGR2 is registered in the data map as a value corresponding to the optimal EGR ratio for the engine rpm NE and intake pressure PM. When the CPU 33 calculates SEGR2 based on the data map, the CPU 33 sets the target EGR valve opening SEGR2 to the target EGR valve opening SEGR in step 415, and guard processing in step 407 is performed for this value. In step 410, if the CPU 33 determines that the coolant temperature THW has not reached the EGR start temperature THEGR or if the CPU 33 detects that the engine is idling (XIDL=0) in step 413, the CPU 33 substitute "0" to the target EGR valve opening SEGR (SEGR←0) to close the EGR valve 10 completely.

As above, after the engine has warmed up, the CPU 33 switches to the normal EGR control to operate the EGR in the entire ranges so that the emission reduction effect can be further enhanced.

Also, according to the device in the embodiment, opening and closing of the EGR valve 10 is operated by the stepping motor. However, as long as the EGR valve is a so-called electrically controlled type, the EGR valve can be any type of electric control valves. If an electrical valve is used as above, EGR control performance by the valve will not be affected even during low-temperature idling.

Also, according to the device in this embodiment, the engine idling state is detected based on the value of throttle opening TA. However, if the device is applied to an engine with an idle switch, the idling state is detected based on the on/off switching of the idling switch.

Also, according to the device in the embodiment, the target ISC valve opening SISC and the last EGR valve opening SEGR are limited to guard valves. However, if the respective calculated values are sufficiently reliable, it is not necessary to set the guards.

According to the invention, the appropriate EGR amount corresponding to the target rpm may be performed constantly.

Therefore, even in the low-temperature idling range before the catalytic converter is activated, deterioration of driveability and engine stalling may be prevented while efficiently reducing NOx emissions.

The present invention having been described with reference to the presently preferred embodiment should not be limited thereto but may be modified in many other ways without departing from the spirit of the present invention.

What is claimed is:

1. An exhaust gas re-circulation control device comprising:

a catalytic converter installed in an exhaust system in an internal combustion engine to clean exhaust gas emissions;

an exhaust re-circulation valve which re-circulates a portion of the exhaust gases back to an air intake system;

means for detecting whether the catalytic converter is active or inactive;

means for detecting an engine idling;

means for calculating a target rotational speed while the engine is idling;

idling speed control means for controlling an air intake quantity while the engine is idling to achieve the target idling speed; and exhaust re-circulation valve control means for controlling the opening of the exhaust re-circulation valve according to a target re-circulation quantity of the exhaust gas which is calculated based on the target idling speed, while the catalytic converter is being detected as inactive by the catalytic converter detecting means and the engine is detected as idling by the idling detecting means.

2. An exhaust gas re-circulation control device for internal combustion engines according to claim 1, wherein the exhaust re-circulation valve opening control means calculates the target re-circulation quantity of the exhaust gas in consideration of a cleaning ratio of the catalytic converter in relation to exhaust gas which increases and decreases according to the target idling speed.

3. An exhaust gas re-circulation control device for internal combustion engines according to claim 2, wherein the exhaust re-circulation valve control means comprises:

means for calculating a basic exhaust re-circulation quantity in consideration of the cleaning ratio of the catalytic converter in relation to exhaust gas which increases or decreases depending on the target idling speed;

means for calculating a correction value in order to converge engine speed control using the idling speed control means based on a speed deviation between the target idling speed and an actual engine speed; and means for calculating the target re-circulation quantity of exhaust gas by correcting the basic exhaust re-circulation quantity using the correction value.

4. An exhaust re-circulation control device for internal combustion engines according to claim 1, wherein the exhaust re-circulation valve control means comprises:

means for prohibiting re-circulation of the exhaust gas by shutting off the exhaust re-circulation valve for a specified period of time after the engine starts.

5. An exhaust re-circulation control device for internal combustion engines according to claim 1, wherein the exhaust re-circulation valve control means comprises:

means for prohibiting re-circulation of the exhaust gas by shutting off the exhaust re-circulation valve when fuel supplying to the engine is shut off.

6. An exhaust re-circulation control device for internal combustion engines according to claim 1, wherein the catalytic converter detecting means detects whether the catalytic converter is active or inactive based on a temperature of engine coolant when the engine starts and time that elapses after it starts.

7. An exhaust re-circulation control device for internal combustion engines according to claim 1, wherein the catalytic converter detection means comprises:

a catalytic converter temperature sensor for detecting temperature of the catalytic converter so that whether the catalytic converter is active or inactive is detected, based on the temperature detected by the catalytic converter temperature sensor.

* * * * *